(12) United States Patent
Noda et al.

(10) Patent No.: US 7,038,418 B2
(45) Date of Patent: May 2, 2006

(54) NUMERICAL CONTROL APPARATUS

(75) Inventors: Hiroshi Noda, Yamanashi (JP); Hiroshige Ando, Yamanashi (JP); Yuji Sone, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 107 days.

(21) Appl. No.: 10/646,837

(22) Filed: Aug. 25, 2003

(65) Prior Publication Data
US 2004/0041533 A1 Mar. 4, 2004

(30) Foreign Application Priority Data
Aug. 28, 2002 (JP) .......... 2002-248961

(51) Int. Cl.
*G05B 19/18* (2006.01)

(52) U.S. Cl. .......... 318/569; 318/567; 388/907.5
(58) Field of Classification Search .......... 318/569, 318/567; 355/204; 434/29; 388/907.5
See application file for complete search history.

(56) References Cited

U.S. PATENT DOCUMENTS 4,903,077 A * 2/1990 Oushiden et al. .......... 399/183
5,187,530 A * 2/1993 Watanabe .......... 399/372
5,502,544 A   3/1996 Carolan
5,803,738 A * 9/1998 Latham .......... 434/29

FOREIGN PATENT DOCUMENTS

| EP | 777 167   | 6/1997 |
| EP | 788 041   | 8/1997 |
| JP | 07-222479 | 8/1995 |
| JP | 09-069004 | 3/1997 |
| JP | 10-029179 | 2/1998 |

OTHER PUBLICATIONS

Notice of Grounds of Rejection for corresponding Japanese Application No. 2002–248961 mailed Sep. 14, 2004.
Decision on Final Rejection for corresponding Japanese Application No. 2002–248961 mailed Dec. 14, 2004.

* cited by examiner

*Primary Examiner*—Karen Masih
(74) *Attorney, Agent, or Firm*—Staas & Halsey LLP

(57) ABSTRACT

The numerical control apparatus includes a numerical control part for outputting a move command, one motor control part for generating a PWM signal for a plurality of motors based on the move command from the numerical control part, and a plurality of motor amplfiers for driving the respective motors based on the PWM signal from the motor control part. The motor control part and the plurality of motor amplifiers are placed on a power panel, and the numerical control part and the motor control part are connected by a serial communication line.

8 Claims, 4 Drawing Sheets

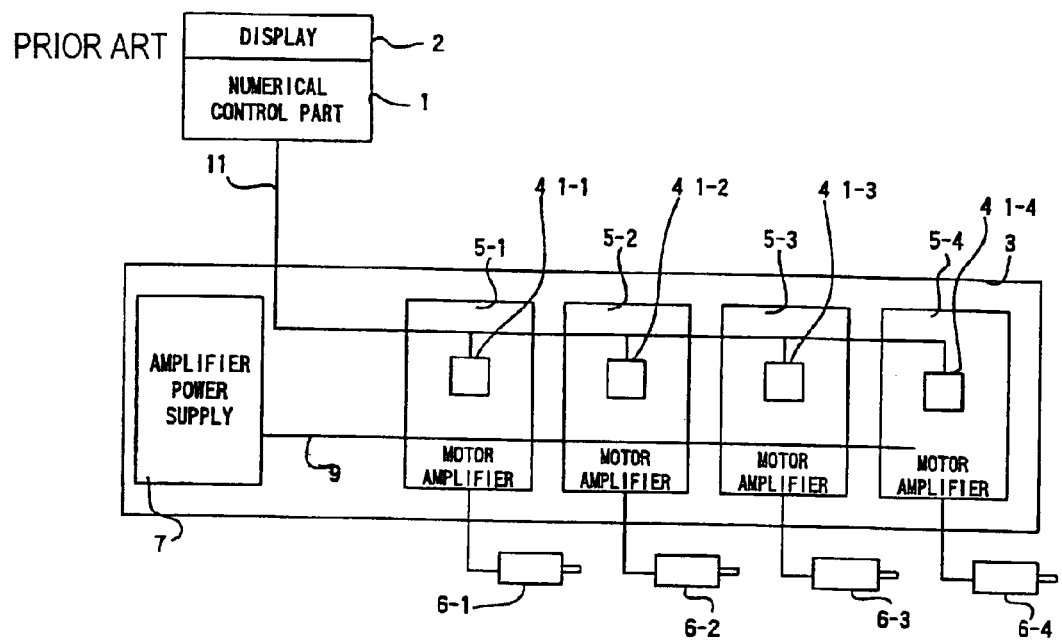
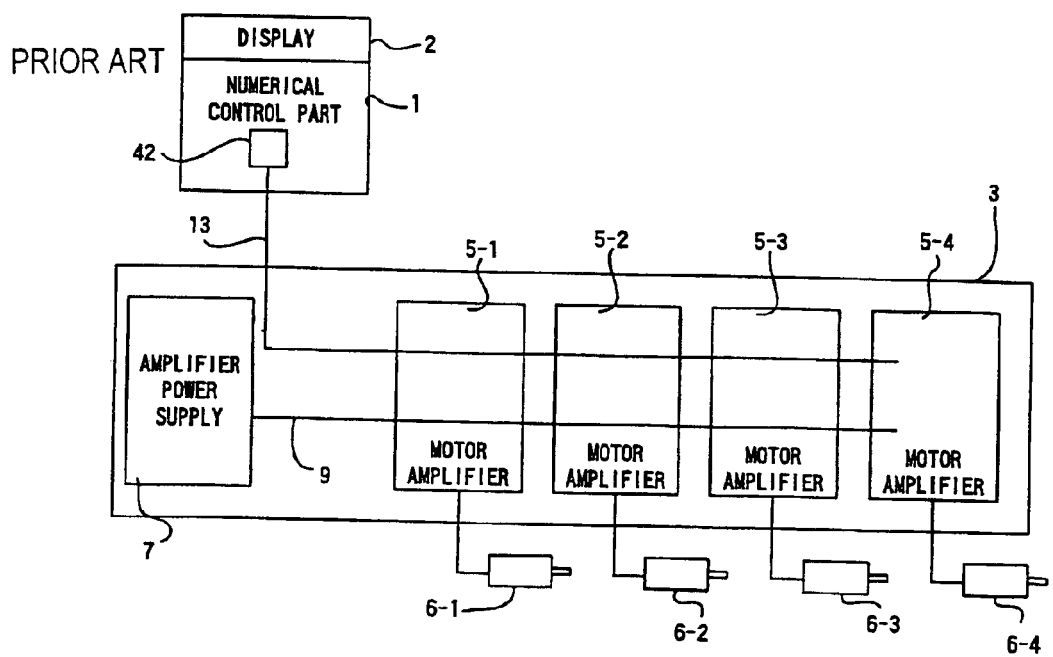

NUMERICAL CONTROL APPARATUS

BACKGROUND OF THE INVENTION

1. Field of the Invention

The present invention relates to a numerical control apparatus for controlling machine tools and the like.

2. Description of the Prior Art

A numerical control apparatus primarily consists of a numerical control part, a motor control part, a motor amplifier, an amplifier power supply, and a motor. The numerical control part outputs a move command to the motor control part. The motor control part generates, based on the command, a PWM (Pulse Width Modulation) signal for rotating the motor by performing loop control processing of position and speed, and the like. The motor amplifier rotates the motor based on this PWM signal. The amplifier power supply provides the motor amplifier with driving power.

FIG. 2 is a schematic diagram of a conventional numerical control apparatus which has been commonly used. The numerical control part 1 is placed away from the power panel 3 along with the display 2. The power panel 3 is placed near the motors 6-1 to 6-4 which drive a machine such as a machining tool. And, on this power panel 3, there are placed motor amplifiers 5-1 to 5-4 for the respective motors which drive each moving part of the machine and an amplifier power supply 7. From this amplifier power supply 7, driving power is delivered to motor amplifiers 5-1 to 5-4 through a power line 9. The motor amplifiers 5-1 to 5-4 include motor control parts 41-1 to 41-4, respectively. Each of these motor control parts 41-1 to 41-4 is connected with the numerical control part 1 by a high-speed communication path 11 consisting of an optical cable or the like, and the numerical control part 1 and the motor control parts 41-1 to 41-4 exchange move commands and various signals with each other through a high-speed serial communication.

Move commands from the numerical control part 1 to the motors 6-1 to 6-4 are sent to the motor control parts 41-1 to 41-4 through the high-speed communication path 11. Upon receiving the move commands, the motor control parts 41-1 to 41-4 generate PWM signals by performing a loop control processing of position, velocity and current, and control the driving of motors 6-1 to 6-4 by controlling the motor amplifiers 5-1 to 5-4 based on the PWM signal.

FIG. 3 shows the numerical control apparatus disclosed in the Japanese Patent Application Laid-Open No. 09-69004; this numerical control apparatus consists of a digital signal processor (DSP) and others, in which a motor control part 42 for controlling a plurality of motors is provided in the numerical control part 1. The motor control part 42, and motor amplifiers 5-1 to 5-4 placed in the power panel 3 are connected by a high-speed communication path 13 of a daisy chain mode with a serial servo bus consisting of a optical fiber cable. Other configurations are the same as the prior art example shown in FIG. 2; the same elements as those of FIG. 2 are given like numerals.

In the prior art example shown in FIG. 3, the motor control part 42 performs loop control processing of position, speed and current for motors 6-1 to 6-4 based on the move commands given to the motors 6-1 to 6-4 from the numerical control part 1 to generate PWM signals so that the PWM signals are sent to the motor amplifiers 5-1 to 5-4 through the high-speed communication path 13. The motor amplifiers 5-1 to 5-4 control the driving of the motors 6-1 to 6-4 respectively based on the PWM signals.

In the numerical control apparatus shown in FIG. 3, since multiple motors 6-1 to 6-4 are controlled by a single motor control part 42, it is easy to perform a cooperative control of the motors. On the other hand, since the motor control part 42 is provided inside the numerical control part 1, a problem exists in that when the numerical control part 1 falls into an abnormal condition, this would affect the motor control part 42 as well thereby resulting in a complete failure of the control.

Also, in the numerical control apparatus shown in FIG. 2, the motor control parts 41-1 to 41-4 are separated from one another, and are provided along with motor amplifiers 5-1 to 5-4 for the motors 6-1 to 6-4. The apparatus offers an advantage in that even if the numerical control part 1 falls into an abnormal condition, the motors 6-1 to 6-4 can maintain a minimum level of control; however, it also has a drawback in that a cooperative control of the motors is difficult since the motor control parts 41-1 to 41-4 are distributed.

Moreover, in the prior art numerical control apparatus shown in FIGS. 2 and 3, since the numerical control part 1 and the motor amplifiers 5-1 to 5-4 are connected by means of optical fiber cables 11, 13, expensive optical interfaces must be provided for the motor amplifiers 5-1 to 5-4 thus resulting in a problem of high cost of the numerical control apparatus.

OBJECT AND SUMMARY OF THE INVENTION

It is an object of the present invention to provide an inexpensive numerical control apparatus which facilitates cooperative control between motors and enables the continuation of control even when the numerical control part falls into an abnormal condition.

The numerical control apparatus according to the present invention comprises: a numerical control part for outputting a move command, a motor control part for generating a PWM signal for a plurality of motors based on the move command from the numerical control part, and a plurality of motor amplifiers for driving each motor based on the PWM signal from the motor control part.

Further, to achieve the object of the present invention, the above described numerical control apparatus is arranged such that the numerical control part is integrally placed with a display, the motor control part is configured so as to control multiple motors with one motor control part, and the motor control part and the above described plurality of motor amplifiers are placed in power panel. In this case, the motor control part may be placed in the power panel independently, or may be incorporated into one of the motor amplifiers, or may be incorporated into an amplifier power supply which is to be placed in the power panel. And, the numerical control part and the motor control part are connected by means of a serial communication line.

Further, the motor control part and the plurality of the motor amplifiers are connected either by means of an electric cable or a serial communication line.

BRIEF DESCRIPTION OF THE DRAWINGS

The above described object and other objects and features of the present invention will become apparent from the following description with reference to the appended drawings. In these drawings;

FIG. 2 is a schematic diagram of a prior art numerical control apparatus;

FIG. 3 is a schematic diagram of another embodiment of the prior art numerical control apparatus;

DETAILED DESCRIPTION OF THE PREFERRED EMBODIMENTS

Figure 1:
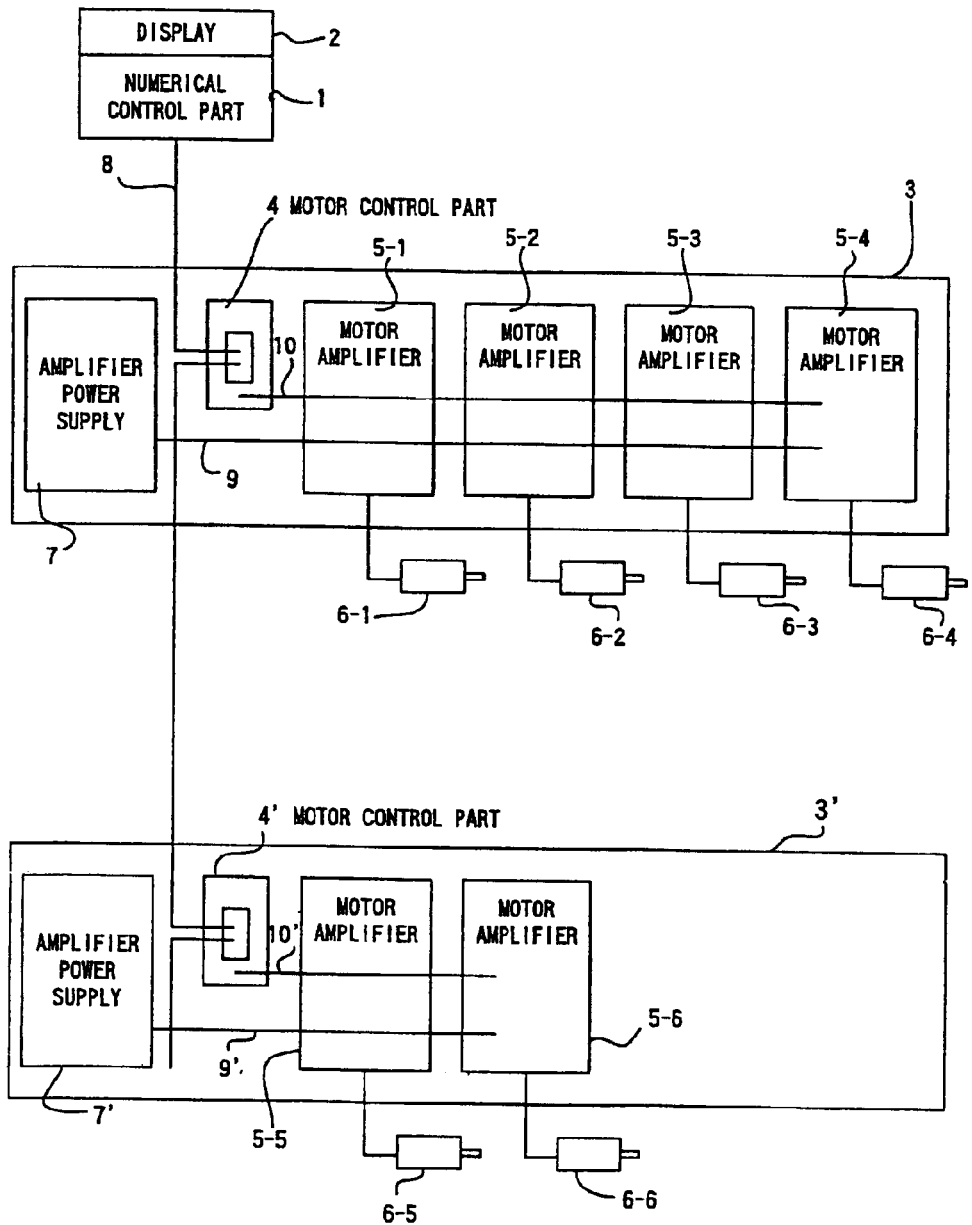
FIG. 1 is a schematic diagram of one embodiment of the numerical control apparatus of the present invention.

FIG. 1 is a schematic diagram of one embodiment of the numerical apparatus of the present invention. The same elements as those of the prior part numerical control apparatus shown in FIGS. 2 and 3 are given like numerals.

In this embodiment, supposing that there are six motors for driving the drive axes of a machine such as a machine tool, etc. to be controlled by this numerical control apparatus, four of the motors 6-1 to 6-4 and two other motors 6-5 and 6-6 are placed at separate locations. The motor amplifiers 5-1 to 5-4 for driving the motors 6-1 to 6-4 are placed on a first power panel 3, and the motor amplifiers 5-5 and 5-6 for driving the motors 6-5 and 6-6 are placed on a second power panel 3' (which is different from the first power panel 3).

The motor amplifiers 5-1 to 5-4 placed on the first power panel 3 are connected with the motors 6-1 to 6-4. Further, an amplifier power supply 7 is arranged on the first power panel 3 and, from this amplifier power supply 7, driving power is supplied to the motor amplifiers 5-1 to 5-4 through the power supply line 9.

Further, on the power panel 3, there is placed a first motor control part 4 consisting of a digital signal processor (DSP), etc. and for controlling the plurality of motors. The first motor control part 4 and each of the motor amplifiers 5-1 to 5-4 are connected by a communication path 10 consisting of an electric cable.

It is also possible to connect the first motor control part 4 to each of the motor amplifiers 5-1 to 5-4 by means of a high-speed serial communication path. In this case, since the first motor control part 4 and the motor amplifiers 5-1 to 5-4 are placed on a single power panel, a short communication path would suffice allowing use of an inexpensive electric cable instead of an optical cable and the like.

The motor amplifiers 5-5 and 5-6 placed on the second power panel 3' are connected with the motors 6-5 and 6-6. The second power panel 3' is placed away from the first power panel 3. Further, there is arranged an amplifier power supply 7' on the second power panel 3' and from this amplifier power supply 7', driving power is delivered to each of the motor amplifiers 5-5 to 5-6 through a power supply line 9'.

Further, there is placed on the second power panel 3' a second motor control part 4' consisting of a digital signal processor (DSP), etc. and for controlling a plurality of motors. This second motor control part 4' and each of the motor amplifiers 5-5, 5-6 are connected respectively through a communication path 10 consisting of an electric cable.

The numerical control part 1 is integrally formed with the display 2, and the numerical control part 1 is connected to the first motor control part 4 on the first power panel 3 and the second motor control part 4' on the second power panel 3' by a serial communication line 8 constituting a high-speed communication path consisting of an optical cable and the like. In the embodiment shown in FIG. 1, the numerical control part 1 is connected with the first and second motor control parts 4, 4' in a daisy chain mode.

The move commands to each of the motors 6-1 to 6-6, which has been determined based on a machining program or the like at the numerical control part 1 and with which the movable parts of the machine are driven, are sent to the first and second motor control parts 4, 4' on the first and second power panels 3, 3' through the serial communication line 8.

The move commands for motors 6-1 to 6-4 cause the first motor control part 4 to generate a PWM signal by performing a loop control processing of position, speed and current, and the signal is sent to each of the motor amplifiers 6-1 to 6-4 through the communication path 10 to drive each of the motors 6-1 to 6-4. In FIG. 1, the position/speed detector for detecting the position, speed, and current of the motors 6-1 to 6-6, and a current detector are omitted.

Further, the move commands for the motors 6-5, 6-6 which are sent through the serial communication line 8, undergo a loop control processing of position, speed and current by the second motor control part 4' of the second power panel 3' to generate a PWM signal, which is sent to each of the motor amplifiers 6-5, 6-6 through the communication path 10' to drive each of the motors 6-5, 6-6.

In the above described embodiment, an example in which two power panels are provided was shown; however, when the motors 6-1 to 6-6 for driving the machine are placed close to each other (in the case of an ordinary machine tool), the motor amplifiers 5-5, 5-6 are also provided on the first power panel 3 without providing a second power panel 3'. And it may be arranged such that electric power is supplied from the amplifier power supply 7 on the first power panel 3, and a loop control processing of position, speed and current is performed at the first motor control part 4 on the first power panel 4 to generate a PWM signal, which is supplied to the motor amplifiers 5-5, 5-6 through the communication path 10.

Figure 4:
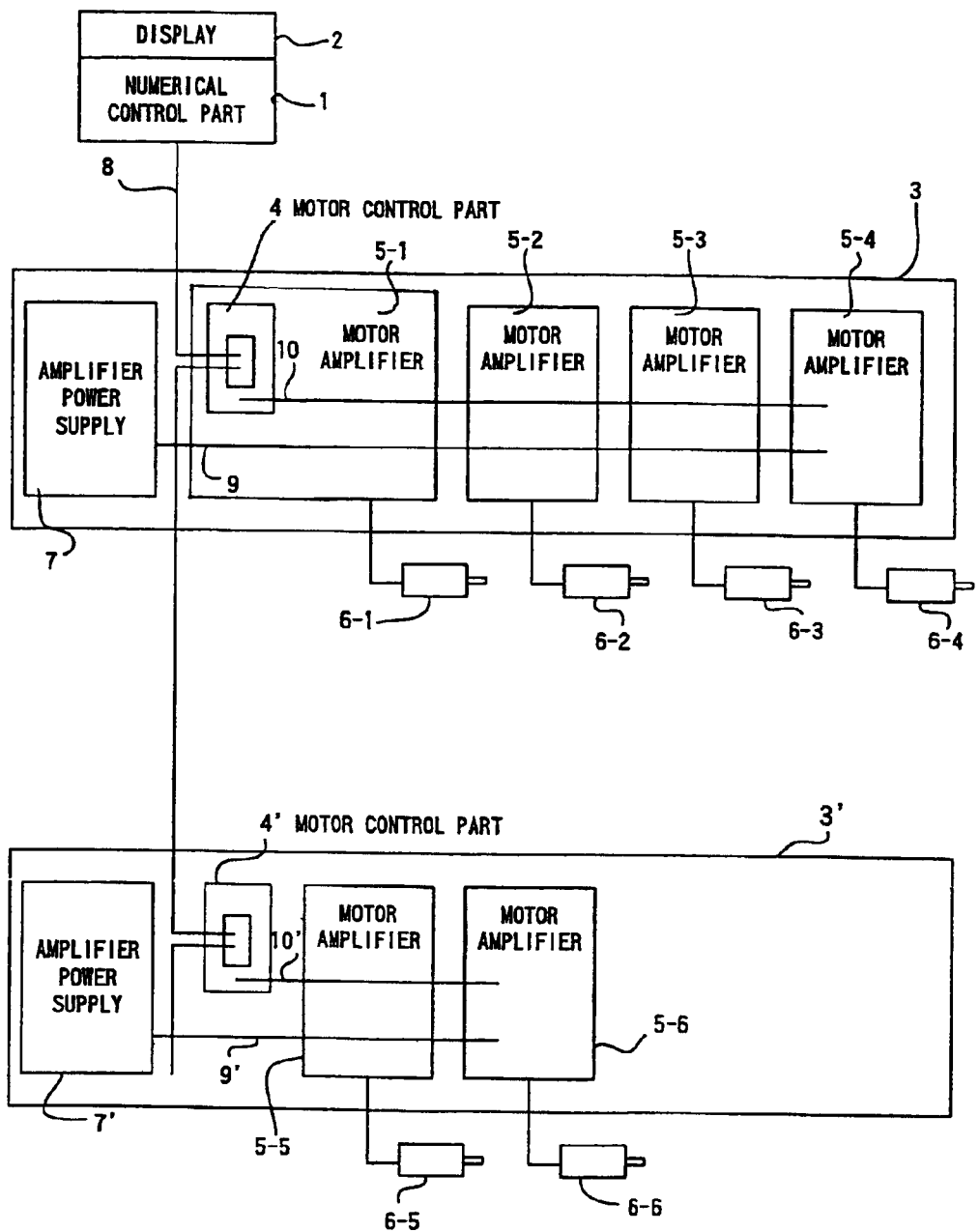
FIG. 4 is a schematic diagram of an alternate embodiment which is a modification of the FIG. 1 embodiment.
Figure 5:
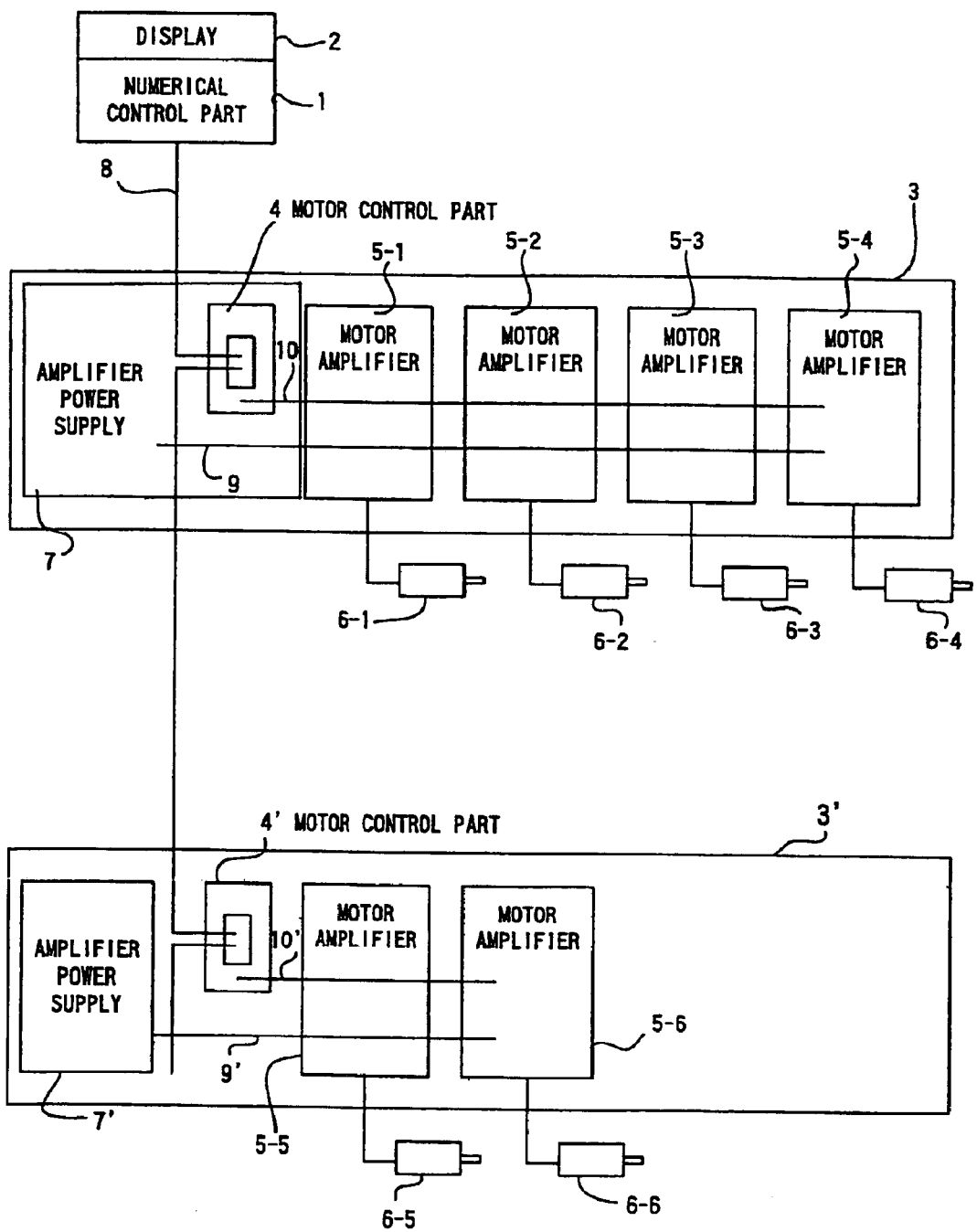
FIG. 5 is a schematic diagram of another alternate embodiment which is a modification of the FIG. 1 embodiment.

Also, in an example of FIG. 1, the motor control parts 4, 4' are provided on the power panels 3, 3' at positions away from the amplifier power supplies 7, 7' and the motor amplifiers 5-1 to 5-4, 5-5, 5-6. Alternatively, the motor control parts 4, 4' may be incorporated into one of the motor amplifiers (see FIG. 4) or one of the amplifier power supplies 7, 7' which are arranged on the power panels 3, 3' (see FIG. 5).

In any way, since the motor control parts 4, 4' are provided outside the numerical control part 1, even if an abnormal situation occurs with the numerical control part 1, the motor control parts 4, 4' would not be affected by that and therefore would remain to be able to control the motors 6-1 to 6-6. Moreover, since the motor control parts are not incorporated into a motor amplifier and the motor control is performed centrally, a cooperative control of the motors can be performed with ease.

Since the motor control part is not incorporated into the numerical control part, and therefore will not be affected by the numerical control part, even if an abnormal situation occurs in the numerical control part, it is possible to control the motor. Moreover, since a plurality of motors can be controlled by a single motor control part without distributing the motor control part, the cooperative control of the motors becomes easy. Furthermore, expensive optical cables and the like are only needed between the numerical control part and the motor control part, thereby it is made possible to reduce expensive optical interfaces. Further, since an inexpensive electric cable can be used between the motor control part and the motor amplifier, the numerical control part itself can be configured at low cost.

What is claimed is:

1. A numerical control apparatus comprising:
a numerical control part integrally placed with a display and outputting a move command;
a motor control part generating a PWM signal for a plurality of motors based on the move command from the numerical control part; and
a plurality of motor amplifiers, each driving a respective one of said plurality of motors based on the PWM signal from the motor control part, wherein
said motor control part is configured so as to control all of the plurality of motors with a single motor control part, and said motor control part and said plurality of motor amplifiers are placed on a power panel; and
said numerical control part and said motor control part are connected by a serial communication line.

2. A numerical control apparatus comprising:
a numerical control part integrally placed with a display and outputting a move command;
a motor control part generating a PWM signal for a plurality of motors based on the move command from the numerical control part; and
a plurality of motor amplifiers, each driving a respective one of said plurality of motors based on the PWM signal from the motor control part, wherein:
said motor control part is configured so as to control all of the plurality of motors with a single motor control part, and said motor control part and said plurality of motor amplifiers are placed on power panel;
said motor control part is incorporated into one of said plurality of motor amplifiers; and
said numerical control part and said motor control part are connected by a serial communication line.

3. A numerical control apparatus comprising:
a numerical control part integrally placed with a display and outputting a move command;
a motor control part generating a PWM signal for a plurality of motors based on the move command from the numerical control part; and
a plurality of motor amplifiers, each driving a respective one of said motors based on the PWM signal from the motor control part, wherein:
said motor control part is incorporated into an amplifier power supply, and said motor control part is placed on a power panel along with said plurality of motor amplifiers; and
said numerical control part and said motor control part are connected through a serial communication line.

4. The numerical control apparatus according to claim 1, 2 or 3, wherein said motor control part and said plurality of motor amplifiers are connected by an electric cable.

5. The numerical control apparatus according to claim 1, 2, or 3, wherein said motor control part and said plurality of motor amplifiers are connected by a serial communication line.

6. A numerical control apparatus comprising:
a numerical control part outputting a move command,
a plurality of motor amplifiers respectively driving a plurality of motors, and
a motor control part generating a motor drive signal to be sent to said plurality of motor amplifiers based on the move command from said numerical control part, wherein
said motor control part is located outside said numerical control part, and communications between said numerical control part and said motor control part, and between said motor control part and said plurality of motor amplifiers are carried out over a communication path.

7. A numerical control apparatus comprising:
a numerical control part outputting a move command;
a plurality of motor amplifiers belonging to a first group and driving a first plurality of motors;
one or more motor amplifiers belonging to a second group;
a first motor control part generating a motor drive signal to be sent to said plurality of motor amplifiers belonging to the first group based on the move command from said numerical control part; and
a second motor control part generating a motor drive signal to be sent to said one or more motor amplifiers belonging to the second group, wherein
said first and second motor control parts are placed outside said numerical control part respectively and are linked to said numerical control part in a daisy chain mode through a serial communication path.

8. A numerical control apparatus comprising:
a numerical control part outputting a move command;
a power panel on which a plurality of motor amplifiers which drive a plurality of motors, are placed;
a motor control part on said power panel to receive the move command from the numerical control part and to generate a control signal which is provided to said plurality of motor amplifiers to cause the plurality of motor amplifiers to drive corresponding ones of said plurality of motors based on the control signal, said numerical control part and said motor control part being connected by a serial communication line.

* * * * *

UNITED STATES PATENT AND TRADEMARK OFFICE
CERTIFICATE OF CORRECTION

| | |
|---|---|
| PATENT NO. | : 7,038,418 B2 |
| APPLICATION NO. | : 10/646837 |
| DATED | : May 2, 2006 |
| INVENTOR(S) | : Hiroshi Noda et al. |

Page 1 of 1

It is certified that error appears in the above-identified patent and that said Letters Patent is hereby corrected as shown below:

On the cover page, item (57), column 2, line 5, change "amplfiers" to --amplifiers--

Column 2, line 46, insert --a-- before "power"

Column 5, line 29, after "on" insert --a--

Signed and Sealed this

Fifth Day of September 2006

JON W. DUDAS
*Director of the United States Patent and Trademark Office*